Figure 7:
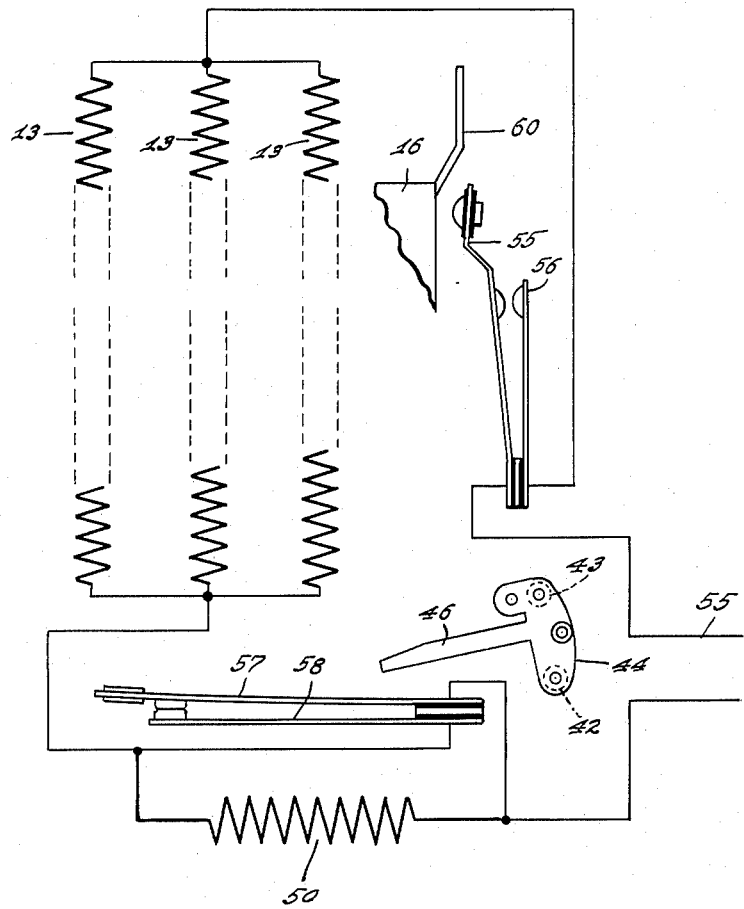

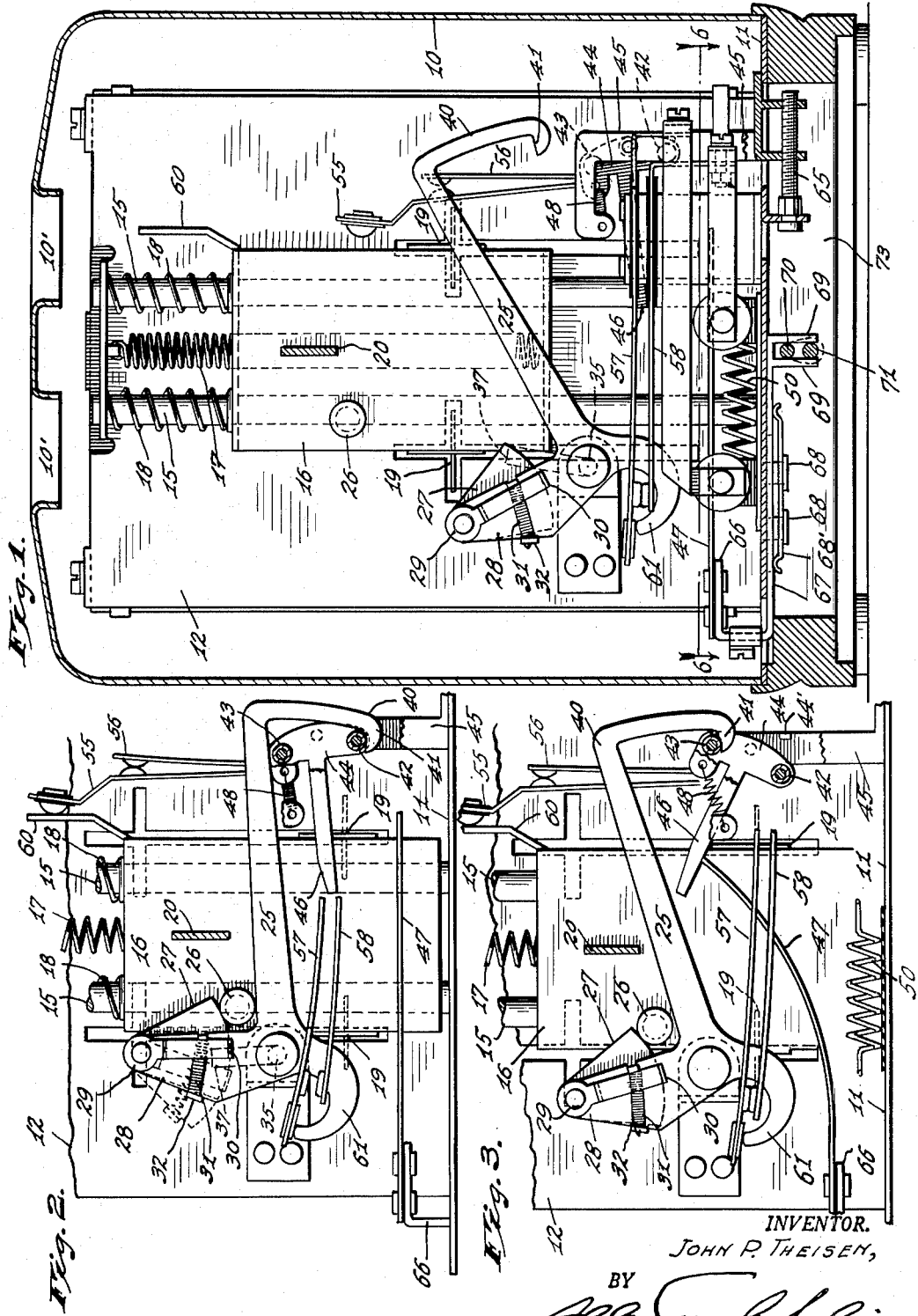
Oct. 11, 1955     J. P. THEISEN     2,720,156
TOASTER
Original Filed Dec. 7, 1946     3 Sheets-Sheet 1
INVENTOR.
JOHN P. THEISEN,
BY
ATTORNEYS Oct. 11, 1955   J. P. THEISEN   2,720,156
TOASTER
Original Filed Dec. 7, 1946   3 Sheets-Sheet 2
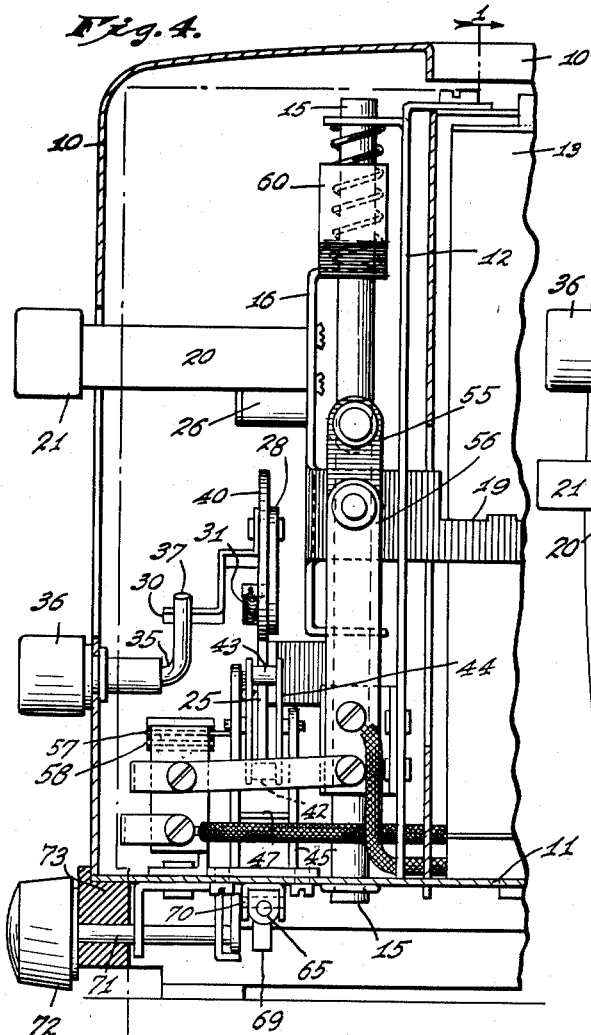
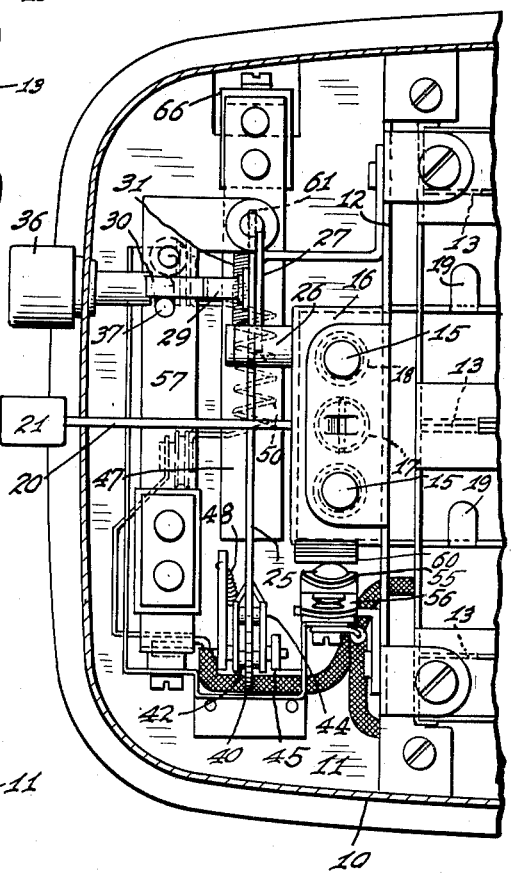
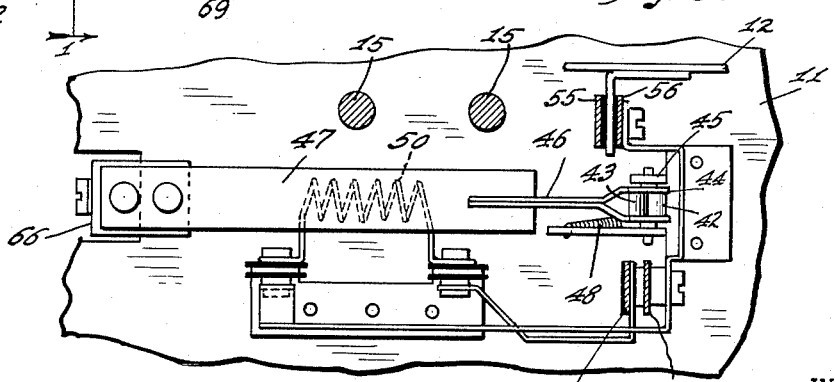
INVENTOR.
JOHN P. THEISEN,
BY
ATTORNEYS.

Oct. 11, 1955 J. P. THEISEN 2,720,156
TOASTER
Original Filed Dec. 7, 1946 3 Sheets-Sheet 3

INVENTOR.
JOHN P. THEISEN,
BY
ATTORNEYS.

United States Patent Office 2,720,156
Patented Oct. 11, 1955

2,720,156
TOASTER

John P. Theisen, Columbus, Ind., assignor to Arvin Industries, Inc., a corporation of Indiana Original application December 7, 1946, Serial No. 714,769. Divided and this application June 13, 1951, Serial No. 237,976

2 Claims. (Cl. 99—329)

This invention relates to automatic bread toasters and to other automatically timed cooking appliances. Such devices, which are not broadly new, commonly include a control switch biased toward open position, a latch mechanism for retaining the control switch closed, and a timing device for releasing the latch at the end of a predetermined interval. Timing devices of many different types have been employed to terminate the cooking operation in bread-toasters and other cooking appliances; but the timing mechanism employed in the device of this application is basically that shown and described in the Denman U. S. Patent No. 1,795,013, issued March 3, 1931.

In the Denman timer, the basic time interval is that required for a heat-responsive element to pass through a cycle including a step in which it is heated and a step in which it is cooled, the heating being accomplished by an electrical resistance heating element the supply of current to which is interrupted at the conclusion of the heating step and, if desired, reinstituted at the completion of the cooling step.

It is an object of this invention to embody the Denman timer in a toaster or other cooking appliance and to vary the duration of the basic Denman timing cycle, whereby to vary the duration of the toasting or other cooking operations controlled by the timer. A further object of this invention is to provide a timer in which the duration of the cooking operation can be varied in a simple and economical manner.

In carrying out my invention, I follow the teachings of the Denman patent by employing an oscillatable escapement lever oscillated by a thermostatic element, conveniently a bimetal strip, which is caused to flex in opposite directions by alternately energizing and de-energizing a resistance heating element associated with the bimetallic strip. The toaster which I prefer to employ is of the "pop-up" variety in which the bread is supported on a carrier movable vertically to lower the bread into and raise it from the toasting compartment. The bread-carrier is biased upwardly and has associated with it a main switch which is in circuit with the toasting elements and which is operated conjointly with the carrier so as to be closed when the carrier is depressed and open when the carrier is raised. Latch mechanism controlled by the oscillatable escapement lever retains the carrier in depressed position, releasing it for upward movement upon the termination of one complete cycle of escapement-lever operation. The means employed to carry the bimetallic strip is mounted for movement toward and from the axis of the escapement lever whereby to vary the ratio between movement of the strip and angular displacement of the escapement lever. To permit inspection of the toast during the toasting operation, the latch mechanism includes a dog movable between operative and inoperative positions and, when in operative position, engageable with the slice-carrier or its support to retain the carrier depressed. Such dog can be engaged or released without affecting operation of the timing mechanism.

The accompanying drawings illustrate my invention:

Fig. 1 is a transverse vertical section through a toaster on the line 1—1 of Fig. 4 showing in end elevation the movable parts in the positions they occupy when the toaster is out of operation; Figs. 2 and 3 are fragmental views similar to Fig. 1 showing the conditions respectively existing during heating and cooling of the thermostatic element; Fig. 4 is a side elevation and Fig. 5 a plan of the timing mechanism; Fig. 6 is a horizontal section on the line 6—6 of Fig. 1; and Fig. 7 is a wiring diagram.

The toaster shown in the drawing comprises a casing 10 enclosing a frame which includes a base plate 11 and a vertical partition 12 extending upward therefrom, the partition serving to protect the timing and control mechanism from the relatively high temperatures existing in the toasting compartments. The particular toaster illustrated is designed to toast two slices of bread simultaneously, and hence embodies three horizontally spaced, vertically extending resistance heating elements 13 defining two toasting compartments access to which is obtained through openings 10' in the top wall of the casing 10.

In front of the partition 12, I provide two spaced, vertical posts 15 which slidably support a carriage 16. The carriage 16 is biased for upward movement by a tension spring 17 connected at its upper end to the partition 12 and at its lower end to the carriage. Buffer springs 18 surrounding the posts 15 above the carriage limit upward movement of the latter and serve to cushion its return from depressed position under the influence of the spring 17. A slice carrier 19 mounted on the carriage 16 extends rearwardly through a slot in the partition 12 and between the heating elements 13 to support the bread in the toasting compartment. In addition to the toast carrier 19, the carriage 16 also supports an arm 20, which extends forwardly through a slot in the front wall of the casing 10 and is there provided with a knob 21 by which the carriage 16 may be depressed.

The latch mechanism for holding the carriage 16 depressed in opposition to the upward effort exerted on it by the spring 17 comprises a latch lever 25 which is pivotally supported from the partition 12. A roller 26 mounted on the front face of the carrier 16 cooperates with an element carried by the lever 25 to retain the carriage in depressed condition. In the preferred form of the invention, the roller-engaging element carried by the lever 25 is retractable, desirably being in the form of a dog 27 which is pivotally mounted on the lever 25 in position to engage the roller 26 but which can be retracted by swinging about its axis of pivotal mounting to a position in which it clears the path of movement of the roller 26. As shown, the dog 27 is in the form of a sector-shaped plate pivotally mounted at its apex upon an upwardly extending arm 28 rigid with the lever 25. The dog 27 is rigid with a rod 29 which extends forwardly through an opening in the arm 28 and which is bent at its forward end to provide an end portion 30 offset from the axis of the dog. A spring 31 has its ends respectively connected to the arm 28 and to a finger 32 which projects forwardly from the dog 27, the spring 32 being arranged to bias the dog 27 for counter-clockwise movement.

Normally, the spring 31 operates to hold the dog 27 advanced toward the path of movement of the roller 26, movement of the dog under the influence of the spring being limited by engagement of the finger 32 with one side of the arm 28. When the carriage 16 is depressed to initiate a toasting operation, the roller 26 engages the lever 25 to swing it in a clockwise direction and cause the dog 27 to move into a position above the roller to hold the carriage depressed as shown in Fig. 2. Until the cooking interval is terminated by operation of the timer hereinafter described, the lever 25 remains in a position such that the dog 27 will overlie the roller 26 as long as the dog is advanced under the influence of the spring 31.

However, by manually moving the dog toward the retracted position illustrated in dotted lines in Fig. 2 it can be made to clear the roller 26, thus freeing the carriage 16 and permitting it to move upwardly under the influence of the spring 17. Upon release of the dog 27 it will again move into advanced position under the influence of the spring 31; so that when the carriage is again depressed the roller 26 will engage the inclined side edge of the dog 27 and cam the dog in a clockwise direction. When, in the downward movement of the carriage 16, the roller 26 clears the dog, the latter is advanced by the spring 31 to overlie the roller and hold the carriage depressed.

For the purpose of effecting release of the dog 27 to permit inspection of the toast during the progress of the toasting operation, I mount on the front wall of the housing 10 a rock-shaft 35 provided outside the housing with an operative knob 36 and inside the housing with a bent end 37 positioned to engage the offset 30 on the rod 29. Preferably, the shaft 35 has associated with it a spring (not shown) urging it in a clockwise direction to maintain the bent shaft-end 37 out of the path of movement of the end 30 on the shaft 29. Upon rotating the shaft 35 in a counter-clockwise direction, the end 37 thereof engages the abutment 30 and swings the dog 27 toward retracted position in which upward movement of the carriage is permitted.

In order that the lever 25 may be held depressed throughout the duration of the cooking operation, I provide at its free end a laterally extending arm 40 terminating in a finger 41 which cooperates with two vertically spaced abutments 42 and 43 on an escapement lever 44. The escapement lever 44 is pivotally mounted on a horizontal axis on a bracket 45 and is provided with a tail 46 adapted to be engaged from below by the free end of a bimetallic strip 47. A spring 48 biases the escapement lever 44 in a counter-clockwise direction to hold it against the abutment 44', in which position the tail 46 is disposed in position above the bimetal strip 47. Disposed in heat-transfering relation to the temperature-responsive strip 47 is an electrical resistance heating element 50, the arrangement being such that as the temperature of the strip 47 rises as a result of heat supplied by the element 50 the free end of the strip will move upwardly to swing the escapement lever 44 in a clockwise direction.

Referring to the wiring diagram constituting Fig. 7, it will be apparent that the supply of electric current from the line 55 to the toasting elements 13 and the heater 50 is under control of a main switch comprising two spring contacts 55 and 56 and that the terminals of the heater 50 are respectively connected to a second pair of spring contacts 57 and 58. The contacts 55 and 56 are conveniently mounted as indicated in Figs. 1 and 2, from which it will be apparent that the contacts are biased toward open position but are engaged whenever the carriage 16 is depressed. Conveniently this result is accomplished by providing the carriage 16 with a cam 60 which engages the free end of the contact 55 to engage it with the contact 56 when the carriage 16 is depressed but which moves out of engagement with the contact 55 to cause opening of the switch when the carriage is elevated.

The two contacts 57 and 58 are under the control of the latch lever 25, and are so arranged as to be open when such latch lever is completely depressed but to be closed at all other times. As shown, the two contacts 57 and 58 are mounted in a generally horizontal position with the upper end of the upper contact 57 overlying a finger 61 on the latch lever. As will be obvious from Fig. 1, the downward pressure which the contact 57 exerts on the finger 61 biases the latch lever 25 for upward movement.

When the toaster is out of operation, the parts occupy the positions shown in Fig. 1, the carriage 16 being at its elevated position, the main switch 55—56 being open, and the heater-switch 57—58 being closed. When bread is to be toasted, two slices are placed respectively in the two heating compartments and the carriage 16 is lowered by the application of a downward pressure to the knob 21. In this downward movement, the roller 26 strikes the latch lever 25 and swings it in a clockwise direction. As the finger 41 moves downwardly, its inclined inner face engages the lower escapement abutment 42 and cams it laterally out of the path of the finger to permit the latter to pass below it. After the finger 41 has passed the abutment 42, the spring 48 restores the escapement lever 44 to its former position with the abutment 42 overlying the finger 41 as shown in Fig. 2. As the latch lever 25 swings downwardly, the dog 27 passes over the roller 26. When the downward pressure has been released from the knob 21, the spring 17 urges the carriage 16 upwardly causing the roller 26 to bear against the dog 27 and urge the lever 25 to swing in a counter-clockwise direction. Counter-clockwise movement of the lever 25, however, is prevented by reason of the engagement of the finger 41 with the abutment 42.

As the latch lever 25 reaches the extreme limit of its downward movement, the finger 61 separates the contacts 57 and 58. As the main switch 55—56 was closed during descent of the carriage 16, current will now be supplied to the toasting elements 13 and to the heater 50. Closing of the switch 55—56 initiates the cooking operation which continues until the latch-lever 25 is released by the escapement lever 44. As the switch 57—58 is opened upon completion of the downward movement of the carriage 16, current is also supplied to the heater 50 to cause a gradual rise in the temperature of the bimetal strip 47. The free end of the bimetal strip moves upwardly as a result of this rise in temperature, its free end eventually striking the tail of the escapement lever and swinging the escapement lever until the abutment 42 clears the finger 41. The escapement lever, being urged upwardly by the upward pressure of the roller 26 on the dog 27, thereupon moves upwardly until the finger 41 engages the abutment 43, which was moved into the path of the finger as the lower abutment 42 was moved out of engagement therewith. This upward movement of the latch lever 25 is insufficient to raise the bread from the toasting compartment but does cause the contact 57 to engage the contact 58 to short-circuit the heater 50. As substantially no current flows through the heater 50 when the contacts 57 and 58 are engaged, the bimetal strip 47 begins to cool, its free end now moving downwardly. Under the influence of the spring 48, the tail 46 of the escapement lever follows the downward movement of the free end of the bimetal strip so that the abutment 43 will eventually become disengaged from the finger 41. When this occurs, all restraint upon the upward movement of the latch lever 25 is removed, the spring 17 moves the carriage 16 upwardly to raise the toast from the toasting compartment, and the main switch 55—56 is opened by the cam 60. By the time the upper escapement abutment 43 has moved far enough to clear the finger 41, the lower escapement abutment 42 has again moved into the path of such finger, so that upon a subsequent operation it will be in position to engage and hold the latch lever depressed.

In order to vary the duration of the toasting interval, the escapement lever 44 and the bimetallic strip 47 are made relatively adjustable in order to vary the angular movement of the escapement lever produced by any given linear movement of the free end of the bimetallic strip. Preferably, two independent means are employed for varying the relative position of the escapement lever and the bimetallic strip, one of such means being adapted to be set by the manufacturer of the toaster as an incident to final inspection to compensate for inevitable manufacturing variations, and the other being adapted for control by the user of the toaster to vary the color of the toast. For the former purpose, the bracket 45 is slidably mounted on the base plate 11 for movement toward and away from the bimetal strip 47 under control of an adjusting screw 65.

To permit variation of the toasting interval by a user of the toaster, the bimetal strip 47 is mounted on a bracket 66 slidably supported on the base plate 11 for movement toward and away from the bracket 45. Conveniently, the bracket 66 extends through a slot in the base plate 11 and includes a portion 67 which lies against the lower face of the base plate. The bracket-portion 67 is slotted for the reception of two shouldered rivets 68 the heads of which retain a leaf spring 68' acting on the bracket-portion 67 to hold it against the lower surface of the base plate 11 and create sufficient friction to retain the bracket in any position to which it has been adjusted. The bracket-portion 67 has at its inner end a pair of parallel, spaced abutments 69 between which is received a bracket-adjusting crank-pin or cam 70. The pin 70 is rigidly mounted on the inner end of a shaft 71 which extends outwardly through the front wall of an open base 73 and is there provided with an adjusting knob 72.

By rotating the shaft 71, the bracket 66 may be moved toward the escapement lever 44 to shorten the toasting interval or away from the escapement lever to lengthen such interval. The alteration in the duration of the toasting interval effected by an adjustment of the bracket 66 results from the fact that movement of the bracket will vary the linear distance between the free end of the bimetal strip and the axis of the escapement lever. Accordingly, the greater the distance between the free end of the bimetal strip and the axis of the escapement lever the farther the free end of the strip will have to move before swinging the escapement lever to the extent necessary to effect release of the finger 41. It may be noted in this connection that adjustment of the bracket 66 affects the respective durations of both the interval during which the thermostat 47 is heated and the interval during which it cools. As a result, a wide range of duration of the toasting interval is readily obtainable.

As previously indicated, timing mechanism embodying an escapement lever oscillated by a bimetallic strip alternately heated and cooled is not new with me but is shown in the Denman Patent No. 1,795,013. A novel feature of this invention resides in the fact that whereas Denman obtained various durations of controlled time intervals by varying the number of oscillations which his escapement lever must make during the interval I vary the duration of each oscillation.

Another novel feature of my invention is the retractable dog 27 by which inspection of the toast during the progress of its toasting can readily be made. When the dog 27 is retracted by momentary oscillation of the shaft 35 in a counter-clockwise direction, the carriage 16 is freed for upward movement under the influence of the spring 17. When, following inspection, the carriage is again lowered the roller 26 engages the inclined side surface of the dog 27, cams the dog out of its path, and engages beneath the dog when the latter again returns to normal position after the roller has cleared it. This entire operation is without effect upon the timer, which will operate to release the lever 25 at the termination of the cooking interval determined by adjustment of the bracket 66.

This application is a division of my prior application Serial No. 714,769, filed December 7, 1946, and now abandoned.

I claim as my invention:

1. In an electric bread toaster having a toasting compartment, an upwardly biased slice carrier for raising and lowering bread into and from said compartment, a resistance heater for toasting bread in said compartment, a main switch controlling said heater, and means actuated jointly with said carrier for closing said switch when the carrier is depressed and for opening said switch when the carrier is raised, an abutment movable with said slice-carrier, a pivoted latch lever having an abutment adapted to overlie said first named abutment and hold the carrier depressed, a shoulder on said latch lever, said lever being engageable by said first abutment in downward movement of the carrier to swing the lever and cause the two abutments to interengage, a pivoted escapement lever having rigid with it upper and lower abutments alternatively movable into the path of and engageable with said shoulder to restrain upward movement of said lever, means biasing said escapement lever toward a position in which the lower abutment thereon is in the path of said shoulder and the upper abutment is out of such path, a temperature-responsive element operative upon an increase in its temperature to swing said escapement lever to move the lower abutment out of engagement with said shoulder and the upper escapement abutment into the path of the shoulder, said temperature-responsive element being operative upon a subsequent decrease in its temperature to permit the escapement lever to swing in the opposite direction and move the upper abutment out of engagement with the shoulder to free the lever for upward movement, an auxiliary heater for said temperature-responsive element, means for rendering said auxiliary heater operative when the shoulder on said latch lever is in engagement with the lower escapement abutment and inoperative at other times, and means for varying the extent to which said escapement lever swings for any given change in the temperature of said temperature responsive element.

2. The invention set forth in claim 1 with the addition that said escapement lever is provided with a radial arm engageable with said temperature-responsive element, said element and escapement lever being relatively adjustable radially of the arm to vary the position along said arm of their point of interengagement.

References Cited in the file of this patent

UNITED STATES PATENTS

| | | |
|---|---|---|
| 2,250,997 | Miller | July 29, 1941 |
| 2,284,450 | Sardeson | May 26, 1942 |
| 2,315,327 | Gomersall | Mar. 30, 1943 |
| 2,344,842 | Weeks | Mar. 21, 1944 |